(12) United States Patent
Lee et al.

(10) Patent No.: US 12,300,038 B2
(45) Date of Patent: *May 13, 2025

(54) METHOD AND APPARATUS WITH LIVENESS DETECTION

(71) Applicant: SAMSUNG ELECTRONICS CO., LTD., Suwon-si (KR)

(72) Inventors: Solae Lee, Suwon-si (KR); Youngjun Kwak, Seoul (KR); Sungheon Park, Suwon-si (KR); Byung In Yoo, Seoul (KR); Yong-Il Lee, Suwon-si (KR); Hana Lee, Suwon-si (KR); Jiho Choi, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,883

(22) Filed: May 16, 2023

(65) Prior Publication Data
US 2023/0306791 A1 Sep. 28, 2023

Related U.S. Application Data

(63) Continuation of application No. 17/313,437, filed on May 6, 2021, now Pat. No. 11,694,480.

(30) Foreign Application Priority Data

Jul. 27, 2020 (KR) .................. 10-2020-0093137
Dec. 18, 2020 (KR) .................. 10-2020-0178770

(51) Int. Cl.
G06V 40/40 (2022.01)
G06T 5/20 (2006.01)
(Continued)

(52) U.S. Cl.
CPC ................ *G06V 40/45* (2022.01); *G06T 5/20* (2013.01); *G06T 5/73* (2024.01); *G06V 10/30* (2022.01);
(Continued)

(58) Field of Classification Search
CPC ........ G06V 10/82; G06V 40/40; G06V 40/15; G06V 20/647; G06V 40/16; G06V 10/44;
(Continued)

(56) References Cited

U.S. PATENT DOCUMENTS 8,139,892 B2   3/2012  Watson
10,275,894 B2  4/2019  Saini et al.
(Continued)

FOREIGN PATENT DOCUMENTS

CA   3043230 C  * 6/2020  ......... G06K 9/00241
CA   3147361 A1 * 2/2021  ............. G06F 16/51
(Continued)

OTHER PUBLICATIONS

Context Based Face Spoofing Detection Using Active Near-Infrared Images—Dec. 2016 (Year: 2016).*
(Continued)

*Primary Examiner* — Nizar N Sivji
(74) *Attorney, Agent, or Firm* — NSIP Law

(57) ABSTRACT

A processor-implemented method with liveness detection includes: receiving a plurality of phase images of different phases; generating a plurality of preprocessed phase images by performing preprocessing, including edge enhancement processing, on the plurality of phase images of different phases; generating a plurality of differential images based on the preprocessed phase images; generating a plurality of low-resolution differential images having lower resolutions than the differential images, based on the differential images; generating a minimum map image based on the low-reso-
(Continued)

lution differential images; and performing a liveness detection on an object in the phase images based on the minimum map image.

20 Claims, 15 Drawing Sheets

(51) Int. Cl.
*G06T 5/73* (2024.01)
*G06V 10/30* (2022.01)
*G06V 40/16* (2022.01)

(52) U.S. Cl.
CPC .. *G06V 40/161* (2022.01); *G06T 2207/20084* (2013.01); *G06T 2207/30201* (2013.01)

(58) Field of Classification Search
CPC .. G06V 40/1388; G06V 40/165; G06V 40/45; G06V 10/30; G06V 40/161; G06V 10/147; G06V 10/20; G06V 40/168; G06V 40/172; G06T 2207/20084; G06T 2207/30201; G06T 5/003; G06T 5/20; H04N 5/213; H04N 5/359; G06N 3/0454; G06N 20/00; G06N 3/02; G06N 3/08
See application file for complete search history.

(56) References Cited

U.S. PATENT DOCUMENTS

| | | | |
|---|---|---|---|
| 10,410,374 | B2 | 9/2019 | Du et al. |
| 10,599,912 | B2* | 3/2020 | Benini ................ G06V 40/45 |
| 2008/0317357 | A1* | 12/2008 | Steinberg ............... H04N 1/62 382/209 |
| 2013/0188840 | A1* | 7/2013 | Ma ....................... G06V 40/45 382/107 |
| 2014/0093140 | A1* | 4/2014 | Juveneton ................ G06T 7/77 382/117 |
| 2016/0019420 | A1* | 1/2016 | Feng ...................... G06V 40/45 382/117 |
| 2016/0239974 | A1* | 8/2016 | Wang ...................... G06T 7/55 |
| 2017/0053406 | A1* | 2/2017 | Hirvonen .................. G06T 7/70 |
| 2017/0061251 | A1* | 3/2017 | Fan ..................... G06V 10/774 |
| 2017/0286788 | A1* | 10/2017 | Fan ...................... G06V 40/166 |
| 2018/0060648 | A1* | 3/2018 | Yoo ....................... G06V 40/40 |
| 2019/0208118 | A1 | 7/2019 | Jasinski |
| 2019/0228248 | A1* | 7/2019 | Han ....................... G06V 10/82 |
| 2019/0266388 | A1 | 8/2019 | Kolagunda et al. |
| 2019/0332757 | A1 | 10/2019 | Chen et al. |
| 2020/0175290 | A1 | 6/2020 | Raja et al. |
| 2020/0210690 | A1 | 7/2020 | Han et al. |
| 2021/0264182 | A1 | 8/2021 | Lee et al. |
| 2022/0148336 | A1* | 5/2022 | Cao .................... G06V 40/168 |

FOREIGN PATENT DOCUMENTS

| | | | | |
|---|---|---|---|---|
| KR | 2000-0032095 A | 6/2000 | | |
| KR | 2003-0027575 A | 4/2003 | | |
| KR | 2003-0091345 A | 12/2003 | | |
| KR | 10-2005-0065543 A | 6/2005 | | |
| KR | 10-2006-0131083 A | 12/2006 | | |
| KR | 10-2008-0004926 A | 1/2008 | | |
| KR | 10-2010-0121817 A | 11/2010 | | |
| KR | 10-2015-0128510 A | 11/2015 | | |
| KR | 10-2017-0081822 A | 7/2017 | | |
| KR | 10-1908481 B1 | 12/2018 | | |
| KR | 10-2019-0080737 A | 7/2019 | | |
| KR | 10-2019-0098656 A | 8/2019 | | |
| WO | WO-2020000908 A1 * | 1/2020 | ......... G06K 9/00268 | |
| WO | WO-2020204150 A1 * | 10/2020 | ......... G06K 9/00221 | |

OTHER PUBLICATIONS

A Combined HOG-LPQ with Fuz-SVM Classifier for Object Face Liveness Detection—2017 (Year: 2017).*
Liveness Detection and Robust Recognition in Iris and Fingerprint Biometric Systems—2015 (Year: 2015).*
Fast Face Anti-Spoofing on Dual-Pixel Mobile Cameras, Anonymous CVPR 2021 Submission, paper ID (9 pages in English).
Extended European Search Report issued on Dec. 15, 2021 in counterpart European Patent Application No. 21187428.4 (9 pages in English).
Akhtar, Zahid, et al. "Liveness detection for biometric authentication in mobile applications." *2014 International Carnahan Conference on Security Technology (ICCST)*. IEEE, (2014).
Das, Dhrubajyoti, and Saptarshi Chakraborty. "Face liveness detection based on frequency and micro-texture analysis." *2014 International Conference on Advances in Engineering & Technology Research (ICAETR-2014)*. IEEE, (2014).
Di Martino, J. Matias, et al. "Liveness detection using implicit 3d features." *arXiv preprint arXiv*:1804.06702 (2018).
Tang, Di, et al. "Face flashing: a secure liveness detection protocol based on light reflections." *arXiv preprint arXiv*:1801.01949 (2018).
Chakraborty, Saptarshi, et al. "An overview of face liveness detection." *arXiv preprint arXiv*:1405.2227 (2014).
Korean Office Action Issued on Jan. 23, 2025, in Counterpart Korean Patent Application No. 10-2020-0178770 (4 Pages in English, 7 Pages in Korean).

* cited by examiner

METHOD AND APPARATUS WITH LIVENESS DETECTION

CROSS-REFERENCE TO RELATED APPLICATIONS

This application is a continuation of U.S. application Ser. No. 17/313,437 filed on May 6, 2021, which claims the benefit under 35 USC § 119 (a) of Korean Patent Application No. 10-2020-0093137 filed on Jul. 27, 2020, and Korean Patent Application No. 10-2020-0178770 filed on Dec. 18, 2020, in the Korean Intellectual Property Office, the entire disclosures of which are incorporated herein by reference for all purposes.

BACKGROUND

1. Field

The following description relates to a method and apparatus with liveness detection.

2. Description of Related Art

Biometric recognition may be used for security verification, to verify users by using the users' fingerprints, irises, facial features, blood vessels, or other biological characteristics. The underlying biological characteristics used in such verifications are intended to be unique for each user as they may rarely change during the lifetime of a user. Such biological characteristics also pose a low risk of theft or imitation, typically providing reliable security verification. Facial recognition or verification, which is a type of biometric recognition, may be used to determine whether a user is a valid user based on a face in a still image or a moving image (or a video). The facial recognition or verification may have an advantage in that a target of the facial recognition or verification may be verified without physical contact between the target and a device of the facial recognition or verification. The facial recognition or verification may be used in various fields of technology including, for example, security, mobile verification, and multimedia data search due to its convenience and effectiveness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with liveness detection includes: receiving a plurality of phase images of different phases; generating a plurality of preprocessed phase images by performing preprocessing, including edge enhancement processing, on the plurality of phase images of different phases; generating a plurality of differential images based on the preprocessed phase images; generating a plurality of low-resolution differential images having lower resolutions than the differential images, based on the differential images; generating a minimum map image based on the low-resolution differential images; and performing a liveness detection on an object in the phase images based on the minimum map image.

The performing of the preprocessing may include removing noise from the phase images, and the edge enhancement processing may include enhancing an edge region of the object in each of the phase images.

The performing of the edge enhancement processing may include applying, to each of the phase images, any one or more of a Sobel filter, an anisotropic filter, a Laplacian filter, a Canny edge filter, and a neural network processing.

The generating of the low-resolution differential images may include: extracting, from a differential image of the differential images, a greatest pixel value for each of a plurality of patch regions in the differential image; and generating a low-resolution differential image of the low-resolution differential images based on the extracted greatest pixel values.

The generating of the low-resolution differential images may include: determining an average value of pixel values in a pixel region for each of a plurality of patch regions in a differential image of the differential images; and generating a low-resolution differential image based on the average values corresponding to the patch regions.

The preprocessed phase images may include a first preprocessed phase image and a second preprocessed phase image, and the generating of the differential images may include: generating shifted second phase images by shifting the second preprocessed phase image by different shift displacements; and generating the differential images including a plurality of differential images each indicating a difference in pixel value between a respective one of the shifted second phase images and the first preprocessed phase image, and a differential image indicating a difference in pixel value between the second preprocessed phase image and the first preprocessed phase image.

The generating of the minimum map image may include: identifying a minimum difference value among difference values of corresponding regions between the low-resolution differential images; and determining a pixel value of the minimum map image based on the identified minimum difference value.

The pixel value of the minimum map image may correspond to either one of: the minimum difference value; and an index of a shift displacement corresponding to a low-resolution differential image including the minimum difference value.

The performing of the liveness detection may include obtaining a result of the liveness detection by applying the minimum map image and the phase images to a neural network-based liveness detection model.

A resolution of the phase images applied to the liveness detection model may be adjusted to correspond to a resolution of the minimum map image.

The phase images may be obtained using a multi-phase detection sensor.

The method may include performing the obtaining of the of the phase images using the multi-phase detection sensor.

The method may include controlling access to one or more functions of an electronic apparatus, based on a result of the performed liveness detection.

A non-transitory computer-readable storage medium may store instructions that, when executed by a processor, configure the processor to perform the method.

In another general aspect, an apparatus with liveness detection includes: a processor configured to: generate a plurality of preprocessed phase images by performing preprocessing, including edge enhancement processing, on phase images of different phases; generate a plurality of differential images based on the preprocessed phase images; generate a plurality of low-resolution differential images having lower resolutions than the differential images, based on the differential images; generate a minimum map image based on the low-resolution differential images; and perform a liveness detection on an object in the phase images based on the generated minimum map image.

The processor may be configured to: for the performing of the preprocessing, remove noise from the phase images; and for the edge enhancement processing, enhance an edge region of the object in each of the phase images.

For the generating of the low-resolution differential images, the processor may be configured to: extract, from a differential image of the differential images, a greatest pixel value for each of a plurality of patch regions in the differential image; and generate a low-resolution differential image of the low-resolution differential images based on the extracted greatest pixel values.

For the generating of the low-resolution differential images, the processor may be configured to: determine an average value of pixel values in a pixel region for each of a plurality of patch regions in a differential image of the differential images; and generate a low-resolution differential image based on the average values corresponding to the patch regions.

For the generating of the minimum map, the processor may be configured to: identify a minimum difference value among difference values of corresponding regions between the low-resolution differential images; and determine a pixel value of the minimum map image based on the identified minimum difference value.

For the performing of the liveness detection, the processor may be configured to obtain a result of the liveness detection by applying the minimum map image and the phase images to a neural network-based liveness detection model, and a resolution of the phase images applied to the liveness detection model may be adjusted to correspond to a resolution of the minimum map image.

The apparatus may include a memory storing instructions that, when executed by the processor, configure the processor to perform the generating of the preprocessed phase images, the generating of the differential images, the generating of the low-resolution differential images, the generating of the minimum map image, and the performing of the liveness detection.

The apparatus may be an electronic apparatus comprising a multi-phase detection sensor configured to obtain the phase images using a plurality of sensor pixels.

In another general aspect, an electronic apparatus includes: a multi-phase detection sensor configured to obtain a plurality of phase images of different phases; and a processor configured to: generate a plurality of preprocessed phase images by performing preprocessing, including edge enhancement processing, on the phase images; generate a plurality of low-resolution differential images having lower resolutions than the preprocessed phase images, based on the preprocessed phase images; generate a minimum map image based on the low-resolution differential images; and perform the liveness detection on an object in the phase images based on the minimum map image.

The processor may be configured to: for the performing of the preprocessing, remove noise from the phase images; for the edge enhancement processing, enhance an edge region of the object in each of the phase images; and for the generating of the low-resolution differential images, generate a plurality of differential images based on the preprocessed phase images, extract, from a differential image of the differential images, a greatest pixel value for each of a plurality of patch regions in the differential image, and generate a low-resolution differential image of the low-resolution differential images based on the extracted greatest pixel values.

For the generating of the low-resolution differential images, the processor may be configured to: generate a low-resolution preprocessed phase image based on a greatest or average value of pixel values in a pixel region for each of a plurality of patch regions in a preprocessed phase image of the preprocessed phase images; and generate a low-resolution differential image of the low-resolution differential images based on the generated low-resolution preprocessed phase image.

In another general aspect, a processor-implemented method with liveness detection includes: preprocessing phase images of different phases based on an edge region of an object in the phase images; reducing a resolution of differential images generated based on the preprocessed phase images; generating a minimum map image based on the reduced-resolution differential images; and performing a liveness detection on the object based on the minimum map image.

The preprocessing may include: removing noise of a region excluding the edge region from the phase images; and enhancing the edge region of the noise-removed phase images.

The reducing of the resolution may include performing a pooling operation on the differential images.

The pooling operation may be either one of a max pooling operation and an average pooling operation.

In another general aspect, a processor-implemented method with liveness detection includes: preprocessing a first phase image and a second phase image based on an edge region of an object in the phase images; generating shifted images by shifting the second preprocessed phase image by respective shift displacements; generating differential images based on differences between the first preprocessed phase image and the respective shifted images; reducing a resolution of the differential images; generating a minimum map image based on the reduced-resolution differential images; and performing a liveness detection on the object based on the minimum map image.

The generating of the shifted images may include generating shift regions by shifting, in one or more directions, a basic region in the second phase image by the respective shift displacements.

The generating of the differential images may include determining differences between a basic region in the first preprocessed phase image and the shift regions.

The method may include controlling access to one or more functions of an electronic apparatus, based on a result of the performed liveness detection.

Other features and aspects will be apparent from the following detailed description, the drawings, and the claims.

Figure 1:
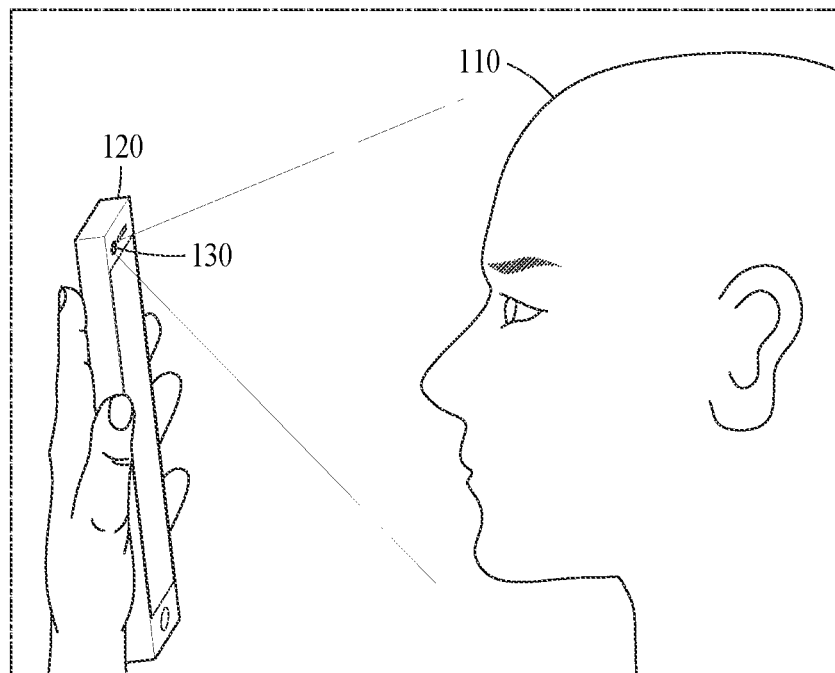
FIGS. 1 and 2 illustrate examples of liveness detection and biometric verification.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. As used herein, the articles "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated features, numbers, operations, members, elements, and/or combinations thereof, but do not preclude the presence or addition of one or more other features, numbers, operations, members, elements, and/or combinations thereof. As used herein, the use of the term "may" with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components according to example embodiments. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may cause ambiguous interpretation of the example embodiments.

Hereinafter, examples will be described in detail with reference to the accompanying drawings, and like reference numerals in the drawings refer to like elements throughout.

Figure 2:
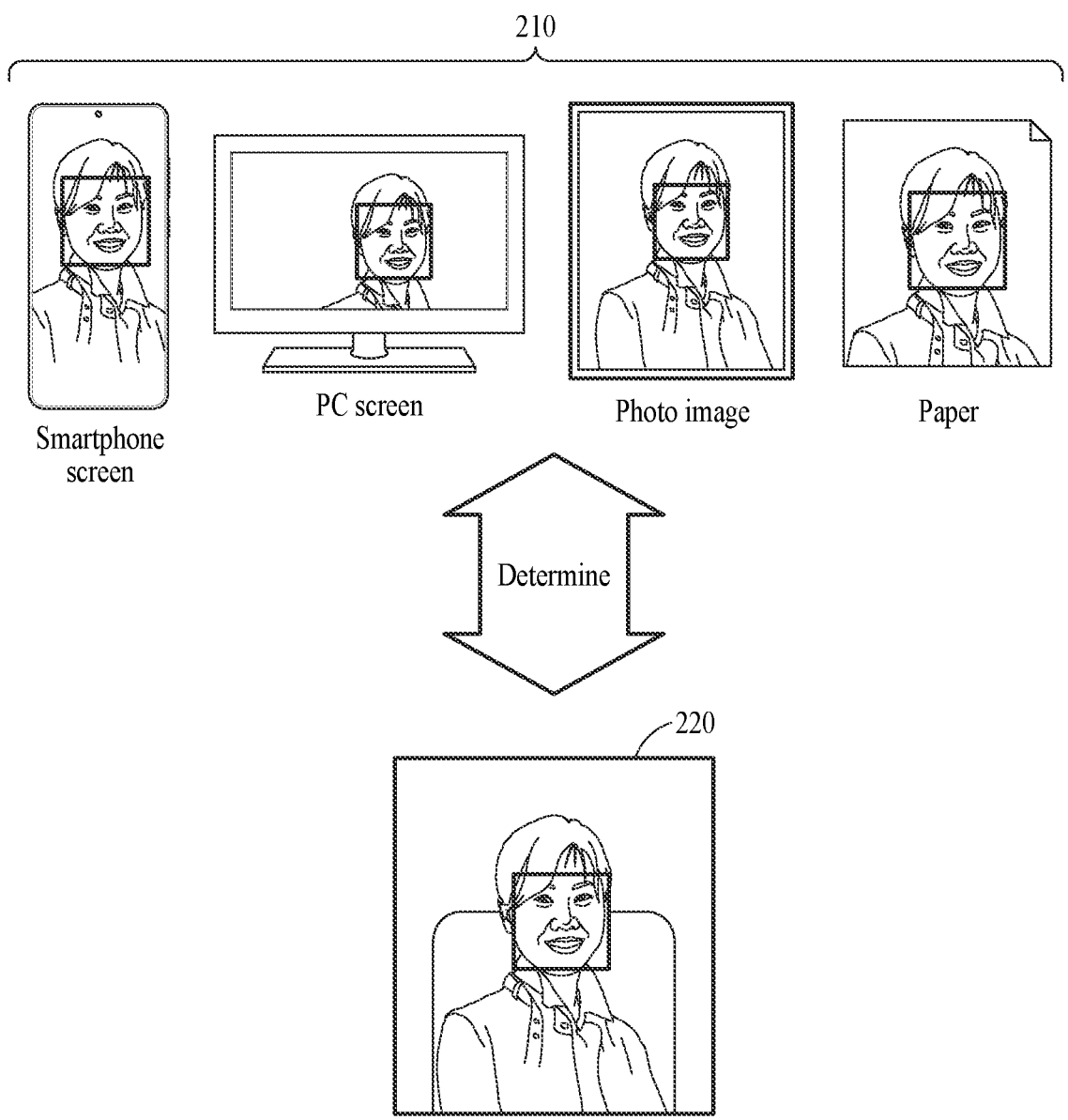

FIGS. 1 and 2 illustrate examples of liveness detection and biometric verification.

Biometrics is one of the user verification methods that use personal bioinformation including, for example, a fingerprint, an iris, a face, a vein, and skin of an individual. Among the user verification methods, a facial verification method may be used to determine whether a user is a valid user, and/or not a valid user, based on information of a face of the user when the user attempts to use his/her face to perform facial verification to unlock a device, log into a device, perform payment services, and perform access control operations, as various examples.

Referring to FIG. 1, an electronic apparatus 120 (e.g., an apparatus with liveness detection 1300 of FIG. 13) may determine whether to verify (or authenticate) an object 110 (e.g., a user) that attempts to connect to the electronic apparatus 120 through biometric verification (e.g., facial verification). The electronic apparatus 120 may obtain image data of the object 110 using an image sensor 130 (e.g., a two-phase detection (2PD) sensor 310 of FIG. 3 or a multi-phase detection sensor 1240 of FIG. 12), analyze the obtained image data, and determine a result of the verification. Such biometric verification may include extracting a feature from the image data, comparing the extracted feature to a registered feature of a valid object, and determining whether the verification is successful or not based on a result of the comparing. For example, when the verification of the object 110 is determined to be successful while the electronic apparatus 120 is in a lock state, the lock state of the electronic apparatus 120 may be canceled and/or changed to an unlocked state. Conversely, when the verification of the object 110 is determined to be unsuccessful, the electronic apparatus 120 may continue to operate in the lock state. The electronic apparatus 120 may be a smartphone, a wearable device, a tablet computer, a netbook, a laptop computer, a desktop computer, a personal digital assistant (PDA), a set-top box, a home appliance, a biometric door lock, a security device, and/or a vehicle start device, as non-limiting examples.

In an example, a valid user may register his/her biological characteristic in advance in the electronic apparatus 120 through a registration process, and the electronic apparatus 120 may store, in a storage device or cloud storage, information to be used to identify the valid user. In this example, a facial image of the valid user or a facial feature extracted from the facial image may be stored as the registered biological characteristic of the valid user.

In such biometric verification, a liveness detection or test may be performed. The liveness detection may be performed to determine whether a test object (e.g., the object 110), which is a target for the liveness detection, is live. That is, the liveness detection may be performed to determine whether a methodology or a biometric characteristic used for the verification is genuine. For example, the liveness detection may be performed to determine whether a face in an image captured by the image sensor 130 is a genuine face or a fake face. The liveness detection may be performed to distinguish, using captured image(s), between a lifeless object (e.g., a photograph, an image, a sheet of paper, a video, and a replica as a fake mechanism or form) and a living object (e.g., a face of a live human being). The electronic apparatus 120 may perform one of the liveness detection and the biometric verification, or both the liveness detection and the biometric verification.

FIG. 2 illustrates examples of a fake face 210 and an example of a genuine face 220. The electronic apparatus 120 may identify the genuine face 220 in image data through a liveness detection. In addition, the electronic apparatus 120 may identify the fake face 210 in a test object image that is obtained by capturing an image of a genuine face of a valid user displayed on a screen of a smartphone or a screen of a personal computer (PC), a printed sheet of paper, or an image of a replica modeled after the genuine face of the user.

An invalid user may try to use a spoofing technique in an attempt to obtain a false acceptance by a biometric verification system. For example, the invalid user may present, to the image sensor 130, an image, a video, a replica, and the like in which a face of a valid user appears, to obtain a false acceptance in facial verification. The liveness detection of one or more embodiments may be used to prevent such false acceptance by filtering out, or blocking, an attempt for the verification made based on such spoofing technique using such substitutes. When a verification object is determined to be a lifeless object as a result of the liveness detection, the verification object may not be allowed to proceed to user verification in which it is compared to a registered object to verify whether it matches the registered object or not, or the user verification may be finally determined to be unsuccessful irrespective of a result of the user verification.

The image sensor 130 may represent visual information of an object (e.g., the object 110 of FIG. 1) as image data of a plurality of phases. The image sensor 130 may detect visual information of the phases, and generate the image data associated with the visual information of each of the phases. The image sensor 130 may be a multi-phase detection sensor which includes, for example, either one of a two-phase detection (2PD) sensor configured to detect two types of phases and a quadrature phase detection (QPD) sensor configured to detect four types of phases. However, the number of phases the image sensor 130 may detect or sense is not limited to the foregoing examples, and the image sensor 130 may detect various numbers of different phases. Although the following examples will be described under the assumption that the image sensor 130 corresponds to a 2PD sensor for the convenience of description, examples are not limited thereto. The following description is also applicable to available examples where the image sensor 130 is a different type of a multi-phase detection sensor.

Figure 3:
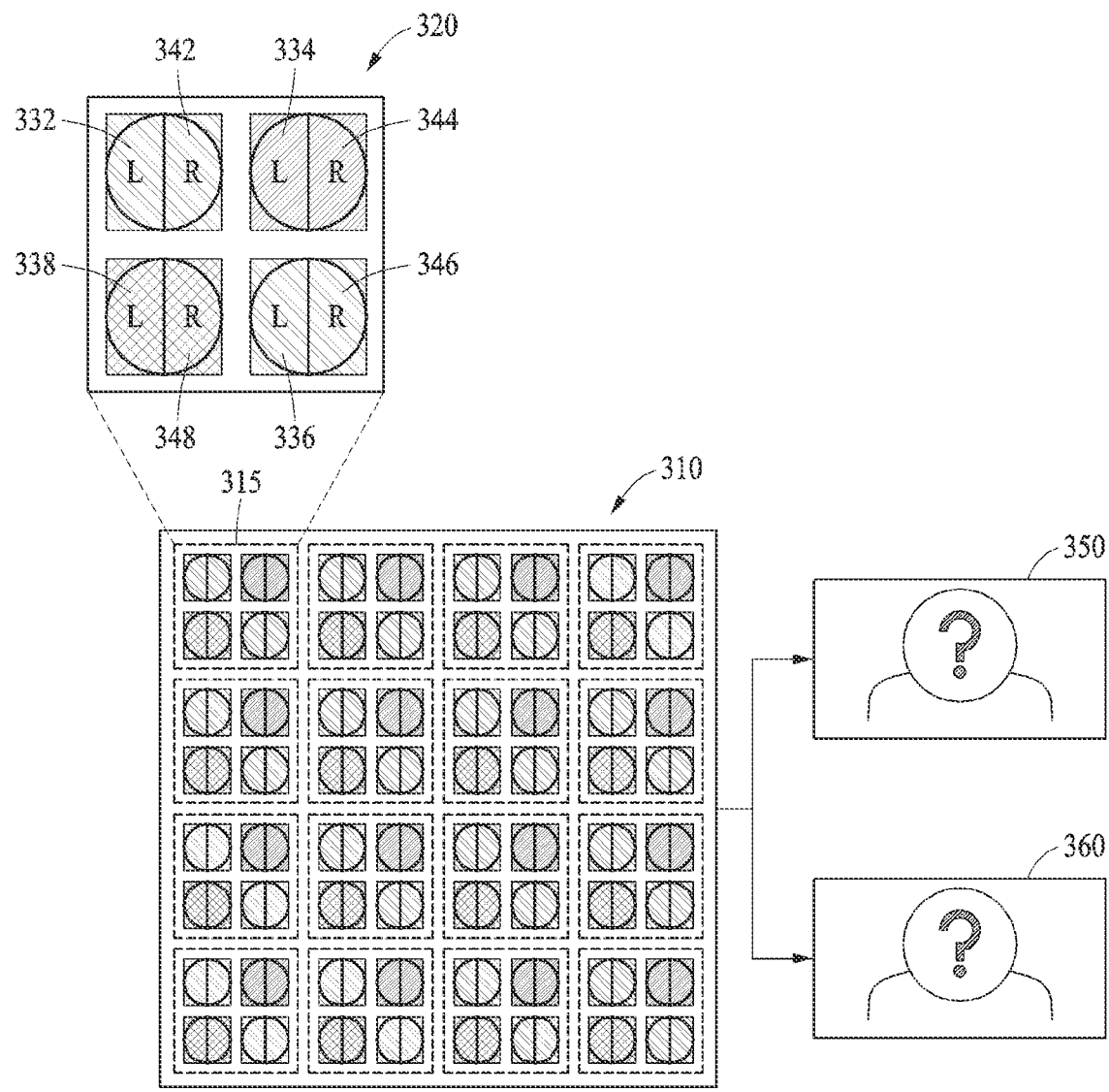
FIG. 3 illustrates an example of a multi-phase detection sensor.

FIG. 3 illustrates an example of a multi-phase detection sensor (e.g., a structure of a 2PD sensor 310 as an example of the multi-phase detection sensor). Referring to FIG. 3, the 2PD sensor 310 may include a plurality of sensor pixels 315 that sense red, green, blue (RGB) color values as two different phases. In the example of FIG. 3, a reference numeral 320 indicates an enlargement of each sensor pixel 315. A sensor pixel 315 may include a plurality of sensor sub-pixels 332, 342, 336, and 346 for sensing a G color value, a plurality of sensor sub-pixels 334 and 344 for sensing a R color value, and a plurality of sensor sub-pixels 338 and 348 for sensing a B color value. In this example, the sensor sub-pixels 332, 334, 336, and 338 may correspond to a first phase (e.g., left (L)), and the sensor sub-pixels 342, 344, 346, and 348 may correspond to a second phase (e.g., right (R)). The structure of the 2PD sensor 310 illustrated in FIG. 3 may be provided merely as an example, and a structure of an arrangement of the sensor pixels 315 is not limited to the example structure illustrated in FIG. 3.

Each sensor sub-pixel included in the 2PD sensor 310 may sense visual information of one of the first phase and the second phase. Each of the sensor sub-pixels 332, 334, 336, 338, 342, 344, 346, and 348 may include a photodiode that receives external light and outputs an electrical signal value based therefrom. By extracting an output value of photodiodes of the sensor sub-pixels 332, 334, 336, and 338 corresponding to the first phase, a first phase image 350 of the first phase may be obtained. By extracting an output value of photodiodes of the sensor sub-pixels 342, 344, 346, and 348 corresponding to the second phase, a second phase image 360 of the second phase may be obtained.

Figure 4:
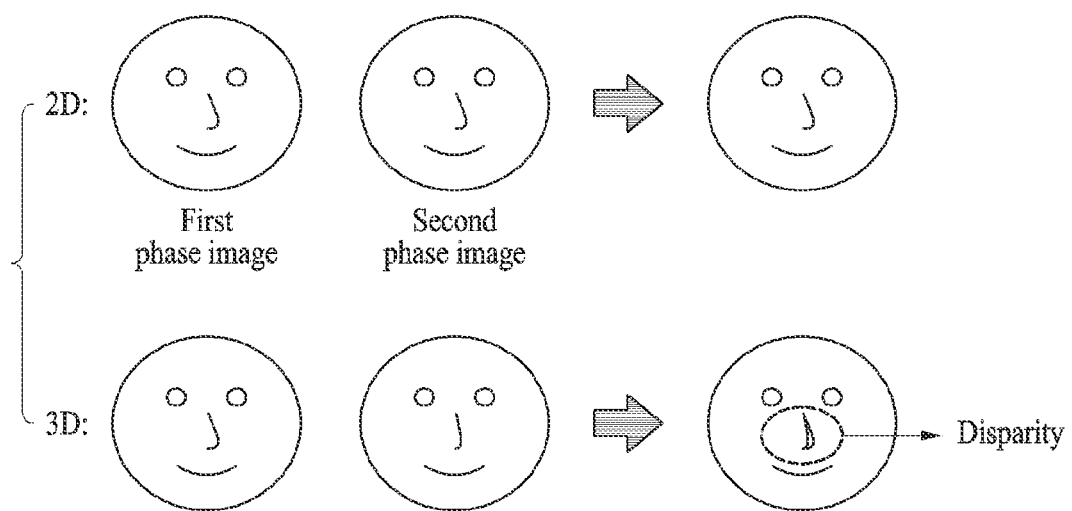
FIG. 4 illustrates an example of a difference between a two-dimensional (2D) image and a three-dimensional (3D) image that are detectable through phase images.

There may be a disparity between the first phase image 350 and the second phase image 360. Such disparity may be used for a liveness detection of an object (e.g., the object 110) of one or more embodiments, thereby improving the accuracy of the liveness detection. The disparity may represent stereoscopic (or three-dimensional (3D)) information of the object, and thus using the disparity may be effective to distinguish a fake or spoof object embodied in two dimensions using a photo or a sheet of paper. FIG. 4 illustrates an example of a difference between a 2D object and a 3D object that may be detected through phase images. Referring to FIG. 4, in a case in which an image of a 2D object is captured by the 2PD sensor 310, a disparity may not be detected through a first phase image and a second phase image. For example, when a photo onto which a face is printed is captured by the 2PD sensor 310, there may be no depth difference between a face region and a background region in the photo, and there may be no depth difference between facial parts. Thus, the disparity may not be detected through the first phase image and the second phase image. In contrast, in a case in which an image of a 3D object is captured by the 2PD sensor 310, the disparity may be detected through the first phase image and the second phase image. In this example, when an image of an actual human face is captured by the 2PD sensor 310, the disparity may be detected in a facial outline and/or a nose by comparing the first phase image and the second phase image.

Referring back to FIG. 1, information associated with a shape, color, texture, and context of the object 110 corresponding to 2D information may be extracted through phase images obtained through the image sensor 130. The electronic apparatus 120 of one or more embodiments may use disparity information derived from the phase images, in addition to the phase images, for a liveness detection, and may apply a feature of a 3D structure of the object 110, thereby improving the accuracy in the liveness detection. The disparity information may be obtained from differential images each indicating a difference in pixel value between the phase images.

A computational amount used for the liveness detection and the accuracy of the liveness detection may have a contradicting relationship. A high level of the accuracy may be achieved by performing the liveness detection based on information of a full resolution of the phase images. However, when the phase images have the full resolution (e.g., a megapixel resolution), a great amount of time and resource may be used to process the phase images of the full resolution. Thus, it may be difficult for a mobile platform, having limited resources, to process the phase images of the full resolution. Thus, to increase a processing speed for the liveness detection and reduce an amount of resource (e.g., memory) used for the liveness detection, the electronic apparatus 120 of one or more embodiments may perform the liveness detection by converting the phase images to a low resolution, rather than using the original phase images obtained by the image sensor 130 without a change. The converting of a phase image to a low resolution may correspond to reducing the size of the phase image. When the electronic apparatus 120 is a mobile device such as a smartphone, there may be significant constraints on a computational amount and an amount of resource, and thus lightening the liveness detection may allow for the liveness detection to be efficiently implemented on the electronic apparatus 120. The lightening may include, for example, the converting of the phase images to a low resolution. However, the converting of the phase images to a low resolution may cause a loss of disparity-related information in the phase images, reduce the accuracy of such disparity information, and/or lower the accuracy in the liveness detection. In addition, the phase images obtained by the image sensor 130 may include a great amount of noise due to a movement of the electronic apparatus 120. Some noise may impede the acquisition of accurate disparity information, and the accuracy in the liveness detection may thereby be lowered.

A liveness detection method of one or more embodiments to be described hereinafter may enable the acquisition of accurate disparity information even from a low resolution, by performing edge enhancement processing to enhance or reinforce an edge component or region of an object in phase images, and by effectively extracting a main pixel from a differential image. The accurate disparity information may increase the accuracy in a liveness detection, and thus the liveness detection method of one or more embodiments may effectively prevent or hinder a false acceptance that may be obtained by a spoofing technique. In a case in which the liveness detection is performed in a mobile platform such as a smartphone, the liveness detection method of one or more embodiments described herein may reduce an amount of computation or operation and an amount of resource required for the liveness detection, and may provide for fully implementing real-time processing. In addition, the liveness detection method of one or more embodiments may improve the accuracy by performing the liveness detection robustly against various spoofing attacks. Hereinafter, the liveness detection method will be described in greater detail.

Figure 5:
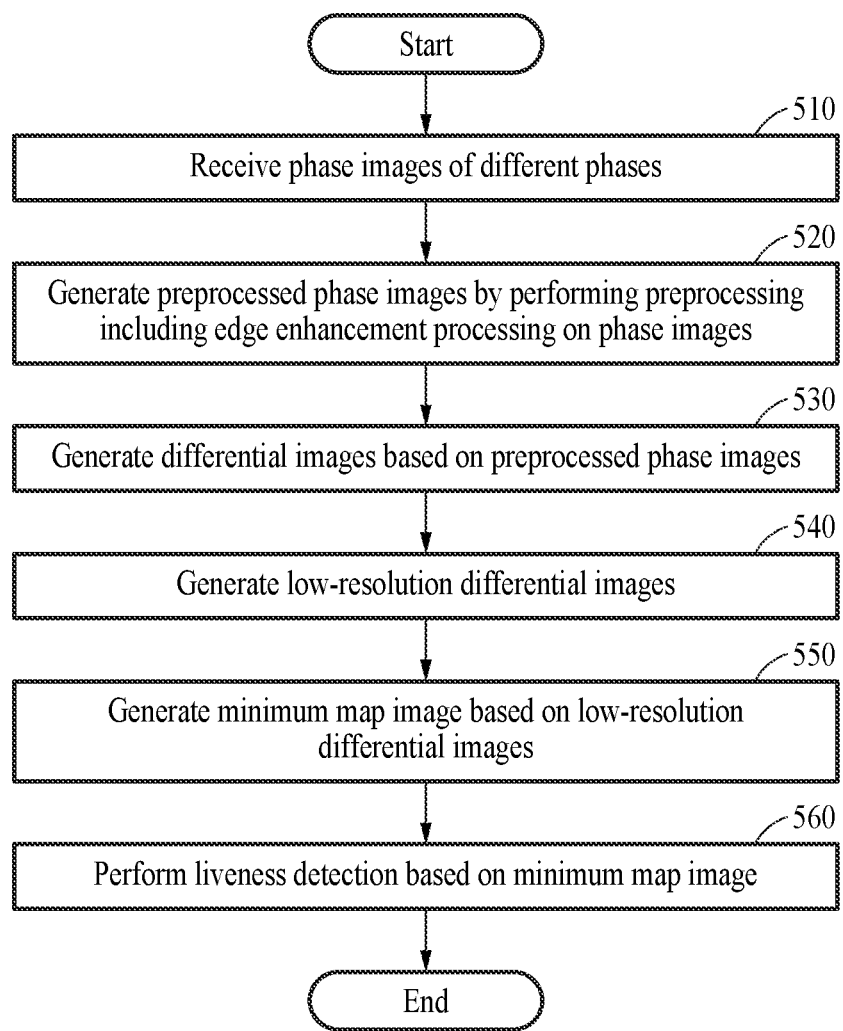
FIG. 5 illustrates an example of a liveness detection method.

FIG. 5 illustrates an example of a liveness detection method.

Referring to FIG. 5, in operation 510, a liveness detection apparatus (e.g., an apparatus with liveness detection 1200 of FIG. 12) may receive a plurality of phase images of different phases (including a first phase image of a first phase and a second phase image of a second phase, for example). The phase images may be obtained using a multi-phase detection sensor (e.g., a multi-phase detection sensor 1240 of FIG. 12).

In operation 520, the liveness detection apparatus may generate a plurality of preprocessed phase images (including a first preprocessed phase image and a second preprocessed phase image, for example) by performing preprocessing including edge enhancement processing on the phase images. In the preprocessing, the liveness detection apparatus may remove noise from the phase images, and perform the edge enhancement processing to enhance (or reinforce) an edge region of an object in each of the phase images. For example, the liveness detection apparatus may perform the edge enhancement processing by applying a Sobel filter to each of the phase images. However, examples are not limited to the foregoing example of using the Sobel filter to perform the edge enhancement processing. For another example, the edge enhancement processing may be performed by using any one or more of an anisotropic filter, a Laplacian filter, and a Canny edge filter, or by using a neural network. To match the phase images, the liveness detection method of one or more embodiments may perform a comparison on an edge region (e.g., an outline of a face) more easily and more accurately than a comparison on a flat region (e.g., a cheek of a face and/or a region excluding the edge region) performed by a typical liveness detection method. Thus, information associated with the edge region may be important and may be used to obtain accurate disparity information. Through the edge enhancement processing, the edge region in the phase images may be enhanced or reinforced, and noise of a flat region in the shape of the object may be removed.

For example, in operation 520, the liveness detection apparatus may perform gamma correction on the phase images before performing the edge enhancement processing, and may perform the edge enhancement processing on phase images obtained by performing the gamma correction. The gamma correction may correct a brightness value of the phase images using a nonlinear transfer function and may be performed with a low calculation (or computation) amount. The liveness detection apparatus may also perform denoising to remove noise from the phase images before performing the edge enhancement processing.

In operation 530, the liveness detection apparatus may generate a plurality of differential images based on the preprocessed phase images. A differential image described herein may refer to an image indicating a difference in pixel value of a corresponding pixel region between the phase images. For example, when the preprocessed phase images include a first preprocessed phase image and a second preprocessed phase image, the liveness detection apparatus may generate a plurality of shifted second phase images by shifting the second preprocessed phase image by different shift displacements (e.g., where the shift displacements correspond to shifts by a number of pixels in a direction (e.g., rightwards or leftwards)). In this example, the liveness detection apparatus may generate the differential images each indicating a difference in pixel value between a respective one of the shifted second phase images and the first preprocessed phase image. The liveness detection apparatus may calculate a difference in pixel value of a corresponding region between the first preprocessed phase image and a shifted second phase image obtained by shifting the second preprocessed phase image while the first preprocessed phase image is fixed. The liveness detection apparatus may also generate a differential image indicating a difference in pixel value between the first preprocessed phase image and the second preprocessed phase image that is not shifted.

In operation 540, the liveness detection apparatus may generate a plurality of low-resolution differential images having a lower resolution than the differential images. The liveness detection apparatus may generate each of the low-resolution differential images, each with a reduced size, by extracting main pixels from a corresponding one of the differential images. The main pixels described herein refer to pixels including important information or a core signal among pixels in each differential image. In an example, the important information or the core signal includes information that is more determinative of a liveness of an object of the image, compared to information or a signal of a pixel that is not a main pixel. For example, the liveness detection apparatus may extract a greatest pixel value for each patch region from a differential image through max pooling, and generate a low-resolution differential image based on the extracted greatest pixel values. In this example, the low-resolution differential image may consist of the greatest pixel values extracted from patch regions. For another example, the liveness detection apparatus may determine an average value of pixel values in a pixel region for each patch region in a differential image through average pooling, and generate a low-resolution differential image based on the determined average value corresponding to each patch region. In this example, the low-resolution differential image may consist of the average values determined for the patch regions. However, examples are not limited to the foregoing examples using the max pooling and the average pooling, and other methods may also be applicable.

In operation 550, the liveness detection apparatus may generate a minimum map image based on the low-resolution differential images. The minimum map image described herein may refer to an image including a cue to 3D information of the object (e.g., a 3D cue signal), similar to a disparity map. The liveness detection apparatus may identify a minimum difference value among difference values of corresponding regions between the low-resolution differential images. The liveness detection apparatus may determine a pixel value of the minimum map image based on the identified minimum difference value. A pixel value of a corresponding region in the minimum map image may correspond to a selected minimum difference value, or an index of a shift displacement corresponding to a low-resolution differential image including the minimum difference value among the differential images. The index of the shift displacement may refer to a displacement value by which a phase image is shifted. For example, the index of the shift displacement may be +2 in a case of shifting by two pixels rightwards, and +1 in a case of shifting by one pixel rightwards. When there is no shift, the index of the shift displacement may be 0. In addition, the index of the shift displacement may be −2 in a case of shifting by two pixels leftwards, and −1 in a case of shifting by one pixel leftwards.

In operation 560, the liveness detection apparatus may perform a liveness detection on the object in the phase images based on the minimum map image. The liveness detection apparatus may obtain a result of the liveness detection by applying the minimum map image and the phase images to a neural network-based liveness detection model (e.g., a liveness detection model 670 of FIG. 6). Here, a resolution of the phase images to be applied to the liveness detection model may be adjusted to correspond to a resolution of the minimum map image. The minimum map image and the phase images of the same resolution may consist of input patches of the liveness detection model. The minimum map image and the phase images may be concatenated to form an input channel of the liveness detection model.

The phase images included in the input patches may correspond to a full region of the original phase images or a partial region including a region of interest (RoI) (e.g., a face region).

The liveness detection model may include at least one neural network that is trained in advance to detect liveness of the object based on the input patches. The neural network may output a value calculated by internal parameters in response to input data. At least a portion of the neural network may be embodied by hardware including a neural processor or a combination of software and hardware. The neural network may be a deep neural network (DNN) including, for example, a fully connected network, a deep convolutional network, a recurrent neural network, and/or the like. The DNN may include a plurality of layers. The layers may include an input layer, one or more hidden layers, and an output layer. The neural network may be trained to perform a given operation by mapping input data and output data that are in a nonlinear relationship based on deep learning. The deep learning may be a machine learning method applied to solve a given problem from a big dataset. The deep learning may be an optimization process of the neural network to find a point at which energy is minimized while being trained using provided training data.

The neural network may output a liveness score in response to the input data. The liveness score may refer to a value that is a reference to determine whether the object is live. The liveness score may be represented as a value, a probability value, or a feature value that represents whether the object is a genuine or fake object. The liveness detection apparatus may determine the liveness of the object based on whether the liveness score satisfies a preset condition. For example, when the liveness score is greater than a preset threshold value, the liveness detection apparatus may determine the object to be a live genuine object. When the liveness score is less than or equal to the threshold value, the liveness detection apparatus may determine the object to be a lifeless fake object.

As described above, by generating and using, for the liveness detection, the low-resolution phase images instead of using the original phase images obtained through a multi-phase detection sensor, the liveness detection apparatus of one or more embodiments may reduce the computational complexity and the amount of resource used for the liveness detection and thereby enable real-time processing. In addition, through the preprocessing (e.g., including the edge enhancement processing) and the generating of the low-resolution differential images (e.g., including the pooling), for example, proposed herein in the liveness detection, the liveness detection apparatus of one or more embodiments may improve the accuracy (or confidence) of the minimum map image by reducing a loss of the 3D information while generating the low-resolution minimum map image. For example, the liveness detection apparatus of one or more embodiments may improve the accuracy in the liveness detection by effectively filtering out a 2D spoofing attack.

Further, the liveness detection apparatus may perform a control operation in response to the result of the liveness detection on the object. For example, when the object is determined to be a genuine object, the liveness detection apparatus may request the execution of a user verification procedure. However, when the object is determined to be a fake object, the liveness detection apparatus may block access by a user without requesting the execution of the user verification procedure.

Figure 6:
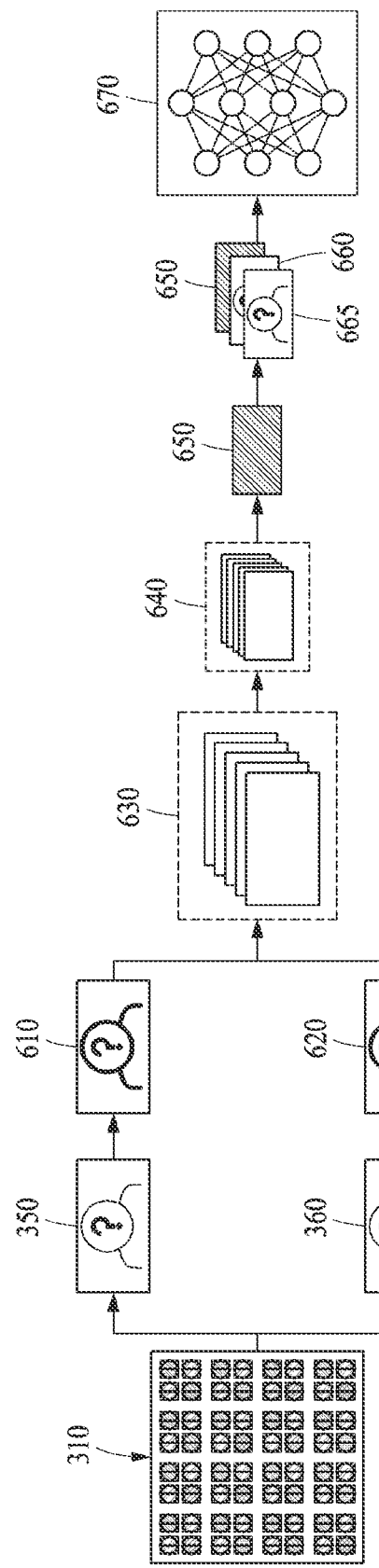
FIG. 6 illustrates an example of a liveness detection method.

FIG. 6 illustrates an example of a liveness detection method.

Referring to FIG. 6, a first phase image 350 and a second phase image 360 may be obtained from a multi-phase detection sensor such as a 2PD sensor 310. A liveness detection apparatus (e.g., an apparatus with liveness detection 1200 of FIG. 12) may generate a first preprocessed phase image 610 and a second preprocessed phase image 620 by performing preprocessing including edge enhancement processing on the first phase image 350 and the second phase image 360, respectively. The edge enhancement processing may include applying, to each of the first phase image 350 and the second phase image 360, a filter that enhances or reinforces an edge region of an object, such as, for example, a Sobel filter and/or an anisotropic filter. Depending on examples, the preprocessing may include gamma correction and/or denoising.

The liveness detection apparatus may generate a plurality of differential images 630 based on the first preprocessed phase image 610 and the second preprocessed phase image 620. The liveness detection apparatus may generate shifted second phase images by shifting the second preprocessed phase image 620 by different shift displacements, and may generate the differential images 630 each indicating a difference in pixel value between the first preprocessed phase image 610 and a respective one of the shifted second phase images. The differential images 630 may also include a differential image indicating a difference in pixel value between the first preprocessed phase image 610 and the second preprocessed phase image 620 that is not shifted.

The liveness detection apparatus may generate a plurality of low-resolution differential images 640 by reducing the size of the differential images 630. For example, the liveness detection apparatus may generate the low-resolution differential images 640 by extracting main pixels from each of the differential images 630 using max pooling.

The liveness detection apparatus may generate a minimum map image 650 based on the low-resolution differential images 640. The liveness detection apparatus may identify a minimum difference value among difference values of corresponding regions between the low-resolution differential images 640, and determine a pixel value of the minimum map image 650 based on the minimum difference value. The liveness detection apparatus may determine the minimum difference value to be the pixel value of the minimum map image 650, or determine a shift index of a low-resolution differential image having the minimum difference value to be the pixel value of the minimum map image 650.

The liveness detection apparatus may generate a first low-resolution phase image 660 and a second low-resolution phase image 665 by reducing a resolution of the first phase image 350 and a resolution of the second phase image 360, respectively. The liveness detection apparatus may then apply, to a neural network-based liveness detection model 670, the first low-resolution phase image 660, the second low-resolution phase image 665, and the minimum map image 650 to perform a liveness detection. The first low-resolution phase image 660, the second low-resolution phase image 665, and the minimum map image 650 with the reduced resolution may be analyzed, rather than the first phase image 350 and the second phase image 360 with a full resolution obtained from the 2PD sensor 310 are analyzed. Thus, by generating and using the images with the reduced resolution, the liveness detection apparatus of one or more embodiments may use a lightened neural network as the liveness detection model 670.

The first low-resolution phase image 660, the second low-resolution phase image 665, and the minimum map image 650 to be input to the liveness detection model 670 may have the same resolution. The first low-resolution phase image 660, the second low-resolution phase image 665, and the minimum map image 650 may form an input channel to be input to the liveness detection model 670 through an input layer of the liveness detection model 670. In another example, the image size of the minimum map image 650 may be reduced such that the minimum map image 650 has a defined or predetermined resolution when input to the liveness detection model 670. In such an example, the image size of the first phase image 350 and the second phase image 360 may also be reduced such that they have the same resolution as the resolution of the minimum map image 650 when input to the liveness detection model 670.

The liveness detection model 670 may output a liveness score in response to input data. When the liveness score satisfies a predefined condition (e.g., being greater than a threshold value), the liveness detection apparatus may determine the object to be a genuine object. When the liveness score does not satisfy the condition (e.g., being less than or equal to the threshold value), the liveness detection apparatus may determine the object to be a fake object.

Figure 7:
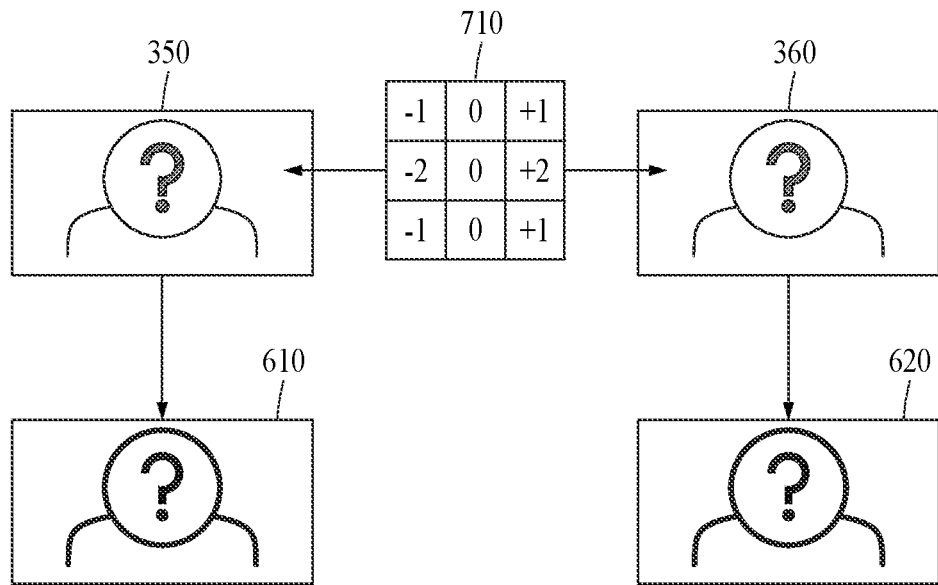
FIG. 7 illustrates an example of edge enhancement processing.

FIG. 7 illustrates an example of edge enhancement processing (e.g., preprocessing).

Referring to FIG. 7, a liveness detection apparatus (e.g., an apparatus with liveness detection 1200 of FIG. 12) may perform edge enhancement processing on each of a first phase image 350 and a second phase image 360. The liveness detection apparatus may perform the preprocessing to enhance an edge region of an object in the first phase image 350 by applying a Sobel filter 710 to the first phase image 350. Also, the liveness detection apparatus may perform the preprocessing to enhance an edge region of an object in the second phase image 360 by applying the Sobel filter 710 to the second phase image 360. Through such preprocessing, a first preprocessed phase image 610 and a second preprocessed phase image 620 that have reduced noise and enhanced edge regions may be obtained. Depending on examples, other edge enhancement filters such as an anisotropic filter, a Laplacian filter, and/or a Canny edge filter may be used. The edge enhancement processing of one or more embodiments may enable the detection of more accurate disparity information in an edge region of an object.

Figure 8:
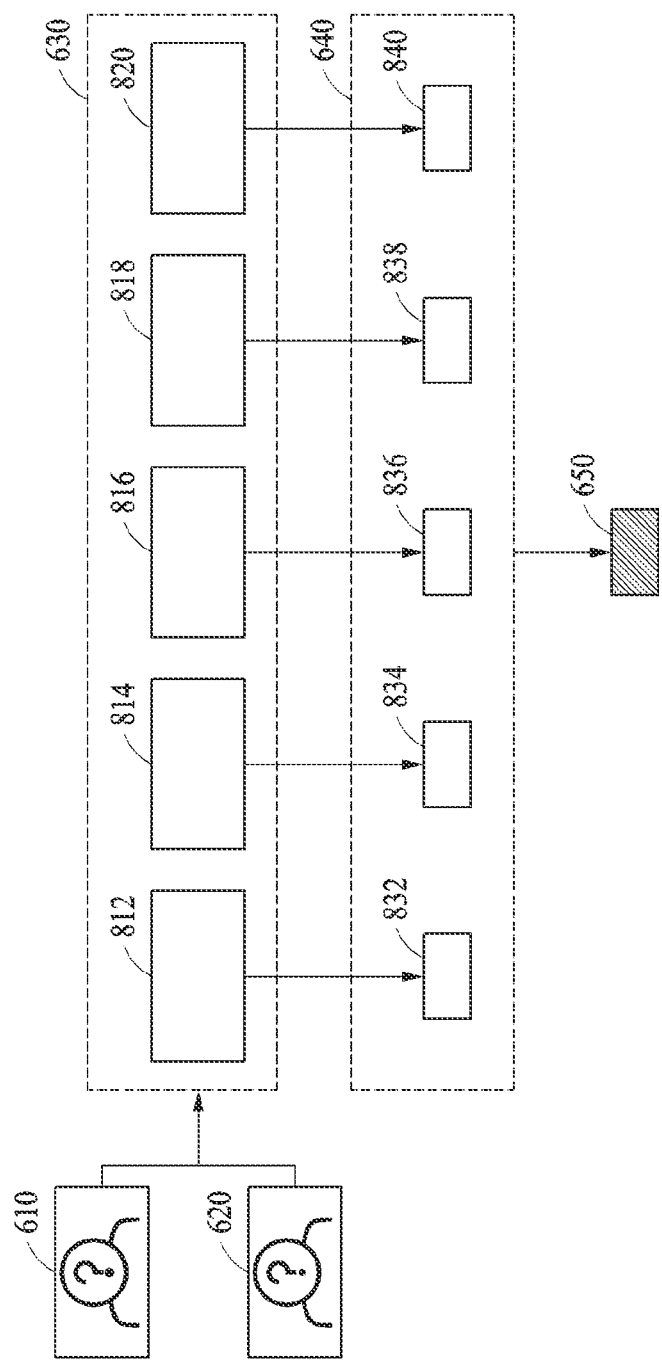
FIGS. 8 and 9 illustrate examples of generating a minimum map image.

FIG. 8 illustrates an example of generating a minimum map image.

Referring to FIG. 8, when preprocessing including edge enhancement processing is performed, differential images 630 may be generated based on a first preprocessed phase image 610 and a second preprocessed phase image 620. In an example, a liveness detection apparatus (e.g., an apparatus with liveness detection 1200 of FIG. 12) may generate the differential images 630 each indicating a difference in pixel value between the first preprocessed phase image 610 and a respective one of shifted second phase images obtained by shifting the second preprocessed phase image 620 by different shift displacements. In the example, as illustrated, the differential images 630 include a first differential image 812, a second differential image 814, a third differential image 816, a fourth differential image 818, and a fifth differential image 820. In an example, the first differential image 812 may indicate a difference in pixel value between the first preprocessed phase image 610 and a shifted second phase image obtained by shifting the second preprocessed phase image 620 by two pixels leftwards, the second differential image 814 may indicate a difference in pixel value between the first preprocessed phase image 610 and a shifted second phase image obtained by shifting the second preprocessed phase image 620 by one pixel leftwards, the third differential image 816 may indicate a difference in pixel value between the first preprocessed phase image 610 and the second preprocessed phase image 620 that is not shifted, the fourth differential image 818 may indicate a difference in pixel value between the first preprocessed phase image 610 and a shifted second phase image obtained by shifting the second preprocessed phase image 620 by one pixel rightwards, and the fifth differential image 820 may indicate a difference in pixel value between the first preprocessed phase image 610 and a shifted second phase image obtained by shifting the second preprocessed phase image 620 by two pixels rightwards. However, examples of generating the differential images 630 are not limited to the foregoing example of shifting the second preprocessed phase image 620. In another example, shifted first phase images may be generated by shifting the first preprocessed phase image 610 by different shift displacements, and differential images each indicating a difference in pixel value between the second preprocessed phase image 620 and each of the shifted first phase images may be generated.

When the differential images 630 are generated, the liveness detection apparatus may generate low-resolution differential images 640 having lower resolutions than the differential images 630. In the example, the liveness detection apparatus may generate a first low-resolution differential image 832, a second low-resolution differential image 834, a third low-resolution differential image 836, a fourth low-resolution differential image 838, and a fifth low-resolution differential image 840 by applying max pooling to the first differential image 812, the second differential image 814, the third differential image 816, the fourth differential image 818, and the fifth differential image 820, respectively. The liveness detection apparatus may then generate a minimum map image 650 based on a minimum difference value among difference values of pixel values of corresponding regions between the low-resolution differential images 640. The minimum map image 650 may have, as a pixel value, the minimum difference value or an index of a shift displacement of a low-resolution differential image including the minimum difference value.

Figure 9:
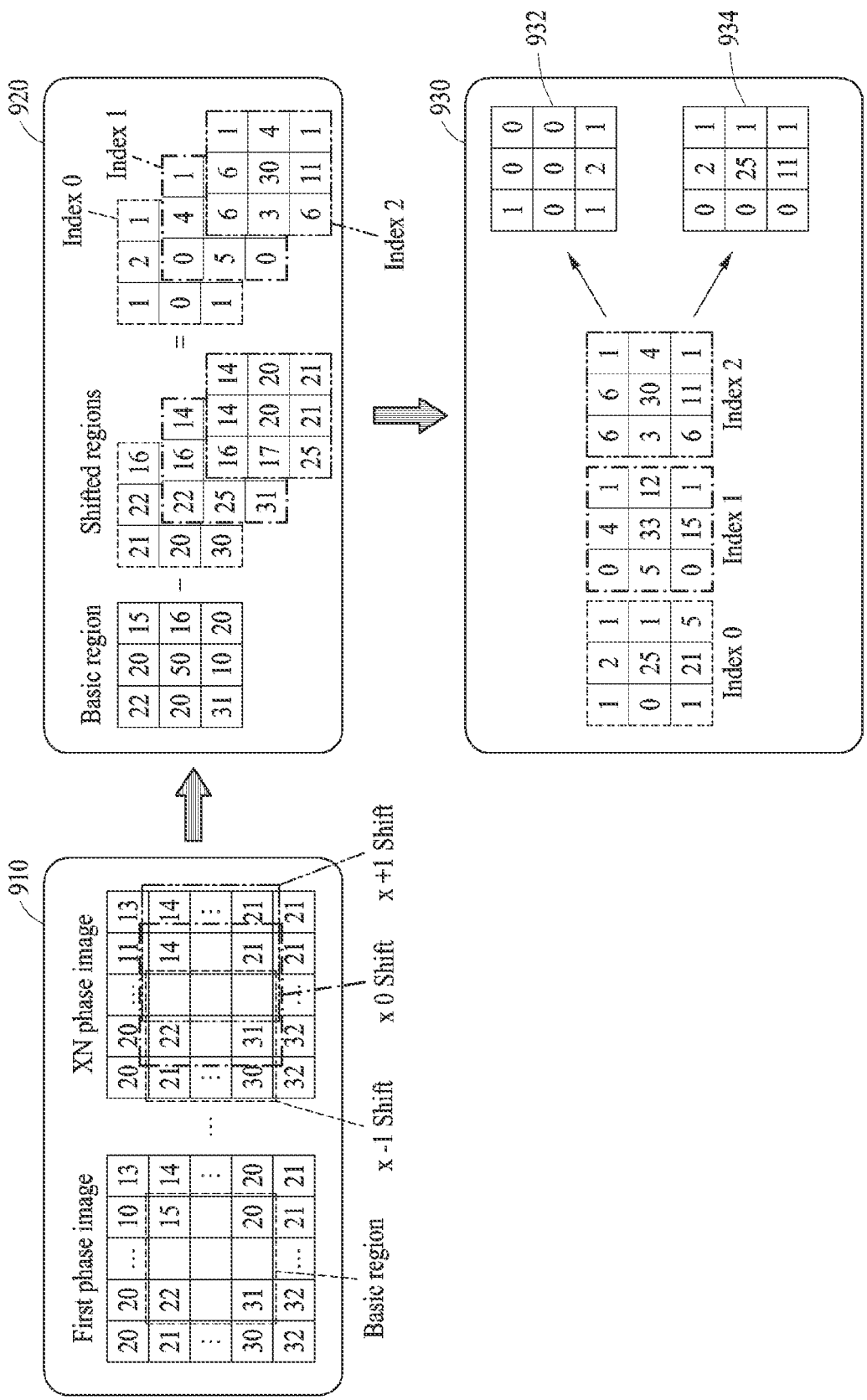

FIG. 9 illustrates an example of generating a minimum map image.

Referring to FIG. 9, in operation 910, a liveness detection apparatus may shift a phase image. The liveness detection apparatus may shift an XN phase image (e.g., a second preprocessed phase image) while a first phase image (e.g., a first preprocessed phase image) is fixed. In the example of FIG. 9, a numeral in each pixel of each phase image may indicate a pixel value. In the XN phase image, X indicates a phase characteristic in a horizontal direction and N indicates the number of phases. For example, in a case in which a first phase image and a second phase image that are generated by a 2PD sensor are used, the second phase image may be indicated as an X2 phase image. Hereinafter, the example will be described under the assumption that the XN phase image corresponds to the second phase image. In the example, the liveness detection apparatus may set a basic region in the first phase image, and set one or more shifted regions in the second phase image. For example, the liveness detection apparatus may set the shifted regions, for example, x−1, x0, and x+1, in the second phase image. In this example, x0 indicates the basic region on which a shift is not performed.

The basic region in the first phase image may also be referred to as a first basic region, and the basic region in the second phase image may also be referred to as a second basic region. The first basic region and the second basic region may correspond to each other in terms of position. In x−1 and x+1, − and + indicate respective shift directions, and 1 indicates a reference shift value. The basic region may be set based on the reference shift value. For example, in a case in which the reference shift value is r, a shift region obtained by shifting the basic region by r in a preset direction may be set.

The liveness detection apparatus may set one or more shifted regions (e.g., shifted regions x−1 and x+1) by shifting the second basic region (e.g., a shifted region x0) by the reference shift value (e.g., 1) in shift directions. The reference shift value may be set to be various values, and the number of shifted regions corresponding to the reference shift value may be set. The number of shifted regions may be determined based on the reference shift value and the number of shift directions.

For example, in a case in which the reference shift value is 1 and the number of shift directions is 2 (e.g., leftward and rightward), there may be three shifted regions (that is, 2×1+1=3). The three sifted regions may include x−1, x0, and x+1. For another example, in a case in which the reference shift value is 5 and the number of shift directions is 2 (e.g., leftward and rightward), there may be 11 shifted regions (that is, 2×5+1=11). The 11 shifted regions may include x−5 through x−1, x0, and x+1 through x+5. For still another example, in a case in which the reference shift value is 1 and the number of shift directions is 4 (e.g., leftward, rightward, upward, and downward), there may be five shifted regions (that is, 2×1+2×1+1=5). The five shifted regions may include x−1, y−1, xy0, x+1, and y+1.

Figure 10A:
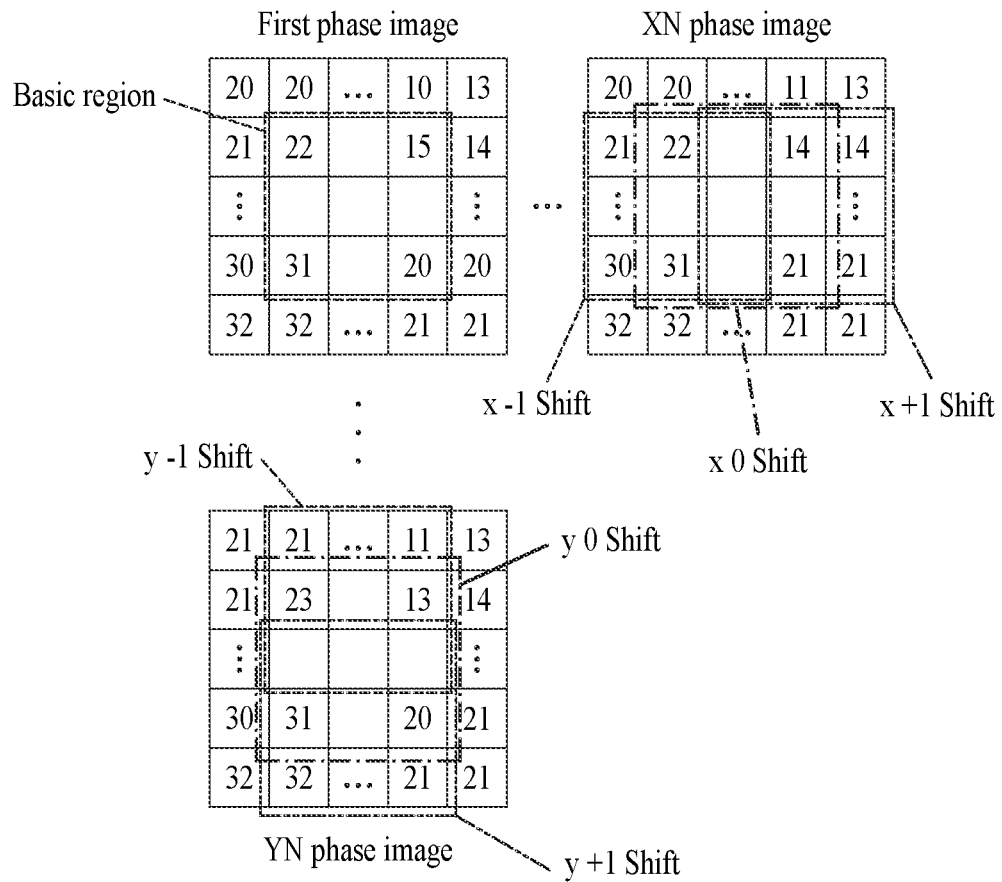
FIGS. 10A and 10B illustrate examples of shifting a phase image.

In a case of using a multi-phase detection sensor such as a QPD sensor, phase characteristics in different directions in addition to a horizontal direction may be identified. For example, as illustrated in FIG. 10A, the liveness detection apparatus may perform a shift on phase images in a horizontal direction and a vertical direction of a QPD sensor, and determine shifted regions for the phase images, respectively. In a case of an XN phase image, shifted regions (e.g., x−1, x0, and x+1) may be determined through a shift in the horizontal direction as described in relation to the image shift 910 described above with reference to FIG. 9. In a case of a YN phase image, shifted regions (e.g., y−1, y0, and y+1) may be determined through a shift in the vertical direction.

In the foregoing cases, in XN and YN, X indicates a phase characteristic in a horizontal direction and Y indicates a phase characteristic in a vertical direction, and N indicates the number of phases. Although the same number of phases is used for the horizontal and vertical directions, different number of phases may also be used for each of the horizontal and vertical directions. N may be determined based on the number of phases identifiable by a sensor. In a case of a QPD sensor, N may be 2 (N=2). In the example of FIG. 10A, there may be a first phase image, an X2 phase image, and a Y2 phase image.

Figure 10B:
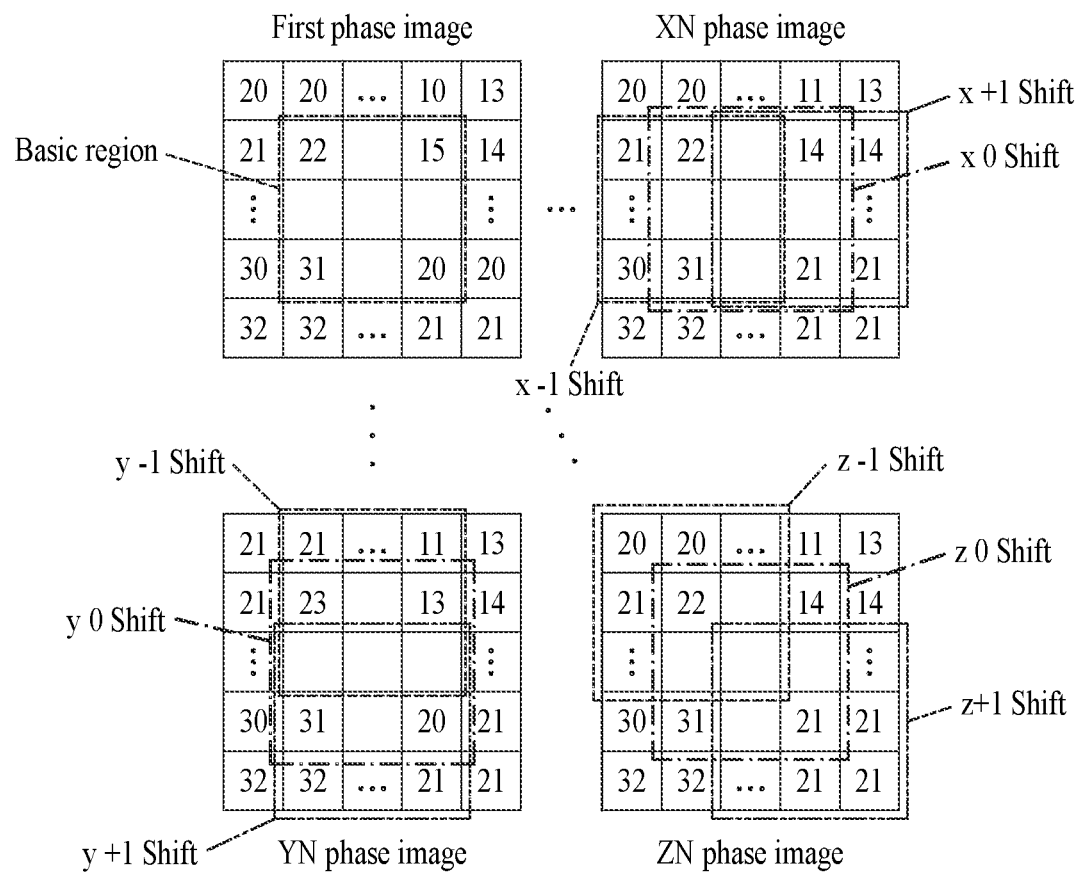

For another example, as illustrated in FIG. 10B, the liveness detection apparatus may perform a shift on phase images in a horizontal direction, a vertical direction, and a diagonal direction of a QPD sensor, and determine shifted regions for the phase images, respectively. In a case of an XN phase image, shifted regions (e.g., x−1, x0, and x+1) may be determined through a shift in the horizontal direction. In a case of a YN phase image, shifted regions (y−1, y0, and y+1) may be determined through a shift in the vertical direction. In a case of a ZN phase image, shifted regions (e.g., z−1, z0, and z+1) may be determined through a shift in the diagonal direction. In ZN, Z indicates a phase characteristic in the diagonal direction, and N indicates the number of phases. For example, in a case in which N is 2 (N=2), a first phase image, an X2 phase image, a Y2 phase image, and a Z2 phase image may be used in the example of FIG. 10B.

Referring back to FIG. 9, in operation 920, when the shifted regions are determined as described above, the liveness detection apparatus may calculate differences between an image of the basic region and an image of each of the shifted regions. For example, the liveness detection apparatus may generate differential images based on a difference between a fixed image (e.g., an image of the first basic region) and each shifted image (e.g., an image of a shifted region), and then generate a minimum map image based on the difference images. For example, the liveness detection apparatus may generate a first differential image based on a difference between the image of the first basic region and an image of a shifted region x−1, generate a second differential image based on a difference between the image of the first basic region and an image of a shifted region x0, and generate a third differential image based on a difference between the image of the first basic region and an image of a shifted region x+1. The liveness detection apparatus may assign an index value to each of the differential images. For example, the liveness detection apparatus may assign index values in the order of x−1, x0, and x+1. In the example of FIG. 9, an index value of 0 is assigned to the first differential image, an index value of 1 is assigned to the second differential image, and an index value of 2 is assigned to the third differential image. However, examples are not limited to the illustrated example, and the index values may be assigned in various orders in various examples.

The liveness detection apparatus may then generate a first low-resolution differential image, a second low-resolution differential image, and a third low-resolution differential image from the first differential image, the second differential image, and the third differential image, respectively, using a pooling method that selects only a portion of pixels. In an example, the images of Index 0, Index 1, and Index 3 shown in operation 930 may respectively correspond to the first low-resolution differential image, the second low-resolution differential image, and the third low-resolution differential image.

In operation 930, the liveness detection apparatus generates a minimum map image. For example, the liveness detection apparatus may identify a minimum difference value among corresponding difference values of corresponding regions in the low-resolution differential images, and determine a pixel value of the minimum map image based on the identified minimum difference image. In the example of FIG. 9, corresponding difference values positioned at (1, 1) are 1, 0, and 6. Among these, 0 is the minimum difference value, and thus 0 may be selected. In addition, corresponding difference values positioned at (2, 2) are 25, 33, and 30. Among these, 25 may be selected as the minimum difference value. As described above, the minimum difference value may be selected from among corresponding difference values between the low-resolution differential images, and the pixel value of the minimum map image may be determined based on the selected minimum difference value.

The pixel value of the minimum map image may correspond to the minimum difference value, or an index of a low-resolution differential image including the minimum difference value among the low-resolution differential images. The minimum map image including the minimum difference value may also be referred to as a minimum difference value map image (e.g., 934), and the minimum map image including the index of the low-resolution differential image including the minimum difference value may also be referred to as a minimum index map image (e.g., 932). In the foregoing example, 0 is selected as the minimum difference value at a position of (1, 1), and an index of a low-resolution difference image including 0 is 1. Thus, a pixel value at (1, 1) in the minimum difference value map image 934 is 0, and a pixel value at (1, 1) in the minimum index map image 932 is 1. In addition, 25 is selected as the minimum difference value at a position of (2, 2), and an index of a low-resolution differential image including 25 is 0. Thus, a pixel value at (2, 2) in the minimum difference value map image 934 is 25, and a pixel value at (2, 2) in the minimum index amp image 932 is 0.

A set of differential images may be generated for each phase image. In the examples of FIGS. 10A and 10B, when there are phase images in different directions, a minimum map image for each of the phase images may be generated based on a set of differential images for each of the phase images. In the example of FIG. 10A, a minimum map image may be generated for each of the XN phase image and the YN phase image. In the example of FIG. 10B, a minimum map image may be generated for each of the XN phase image, the YN phase image, and the ZN phase image.

Figure 11A:
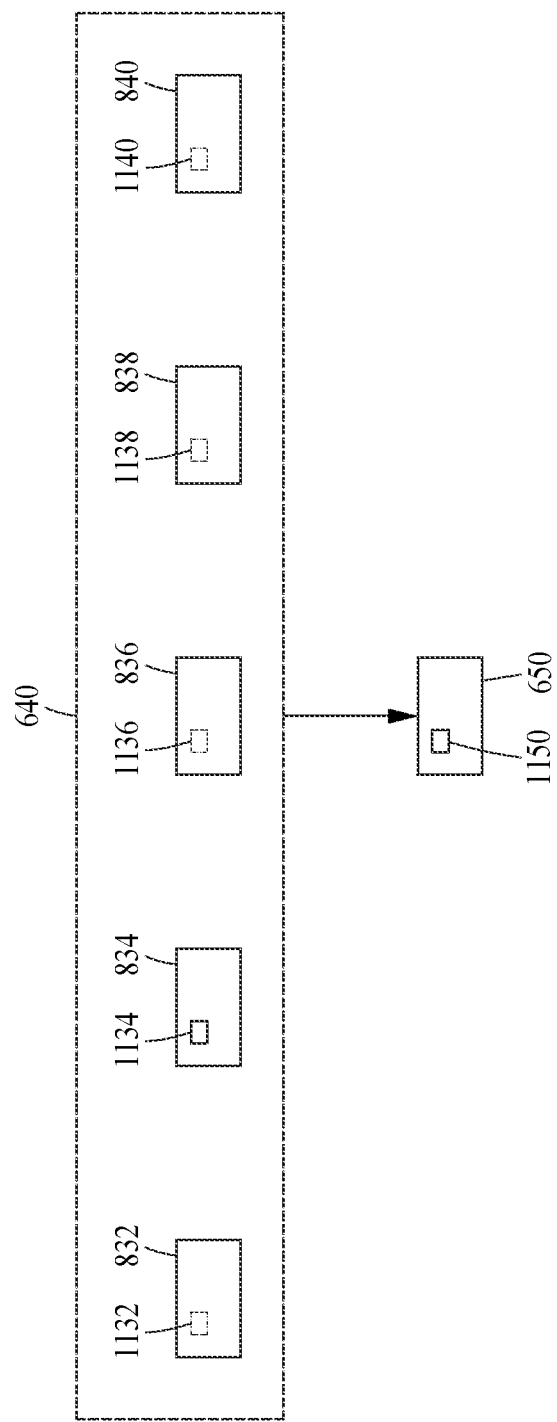
FIGS. 11A and 11B illustrate examples of determining a pixel value of a minimum map image.
Figure 11B:
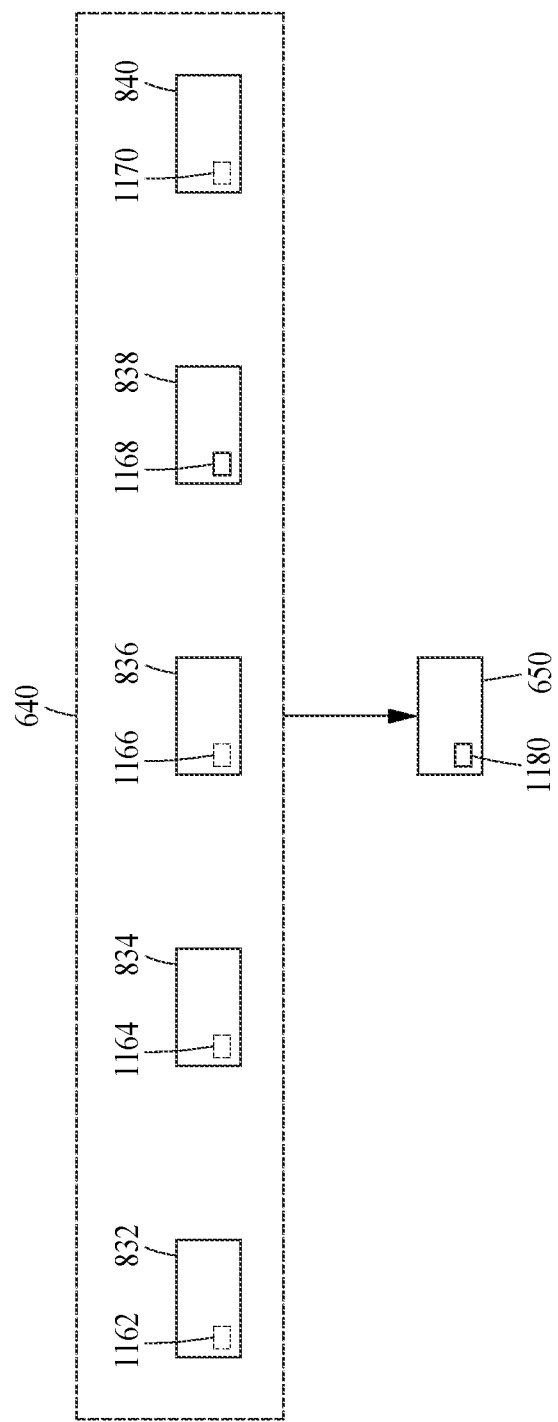

FIGS. 11A and 11B illustrate examples of determining a pixel value of a minimum map image.

Referring to FIG. 11A, a region 1132 in a first low-resolution differential image 832, a region 1134 in a second low-resolution differential image 834, a region 1136 in a third low-resolution differential image 836, a region 1138 in a fourth low-resolution differential image 838, and a region 1140 in a fifth low-resolution differential image 840 are corresponding regions. A liveness detection apparatus may identify a smallest difference value among difference values indicated by the regions 1132, 1134, 1136, 1138, and 1140. For example, in a case in which a difference value of the region 1134 is smaller than respective difference values of the other regions 1132, 1136, 1138, and 1140, the liveness detection apparatus may determine the difference value of the region 1134 to be a pixel value of a region 1150 corresponding to the region 1134 in a minimum map image 650. Alternatively, the liveness detection apparatus may determine a shift index (e.g., −1) corresponding to the third low-resolution difference image 836 including the region 1134 to be the pixel value of the region 1150 in the minimum map image 650.

Referring to FIG. 11B, a region 1162 in a first low-resolution differential image 832, a region 1164 in a second low-resolution differential image 834, a region 1166 in a third low-resolution differential image 836, a region 1168 in a fourth low-resolution differential image 838, and a region 1170 in a fifth low-resolution differential image 840 are corresponding regions. A liveness detection apparatus may identify a smallest difference value among difference values indicated by the regions 1162, 1164, 1166, 1168, and 1170, in a similar way described above with reference to FIG. 11A. For example, in a case in which a difference value of the region 1168 is smaller than respective difference values of the other regions 1162, 1164, 1166, and 1170, the liveness detection apparatus may determine the difference value of the region 1168 to be a pixel value of a region 1180 corresponding to the region 1168 in a minimum map image 650. Alternatively, the liveness detection apparatus may determine a shift index (e.g., +1) corresponding to the fourth low-resolution differential image 838 including the region 1168 to be the pixel value of the region 1180 in the minimum map image 650.

The liveness detection apparatus may determine the minimum map image 650 by performing the foregoing operations on all the corresponding regions in low-resolution differential images 640. By determining pixel values of the minimum map image 650 using minimum difference values, a minimum difference value map image (e.g., the minimum difference value map image 934 of FIG. 9) may be generated. By determining the pixel values of the minimum map image 650 using shift indices, a minimum index map image (e.g., the minimum index map image 932 of FIG. 9) may be generated. When the minimum map image 650 is determined, the minimum map image 650 and phase images of which resolutions are adjusted to be the same resolution as the resolution of the minimum map image 650 may be input to a liveness detection model.

Figure 12:
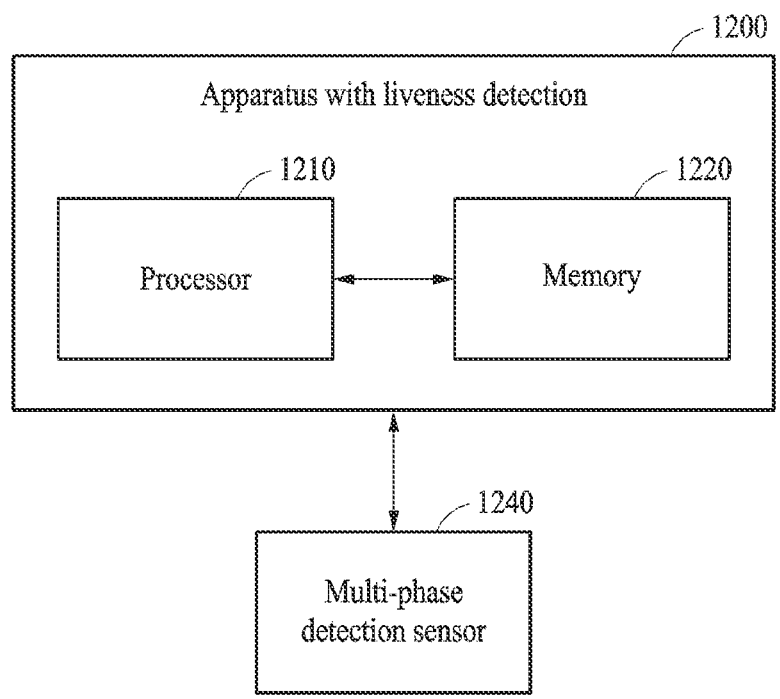
FIG. 12 illustrates an example of an apparatus with liveness detection.

FIG. 12 illustrates an example of an apparatus with liveness detection.

Referring to FIG. 12, an apparatus with liveness detection 1200 may include a processor 1210 (e.g., one or more processors) and a memory 1220 (e.g., one or more memories). The memory 1220 may be connected to the processor 1210 to store instructions executable by the processor 1210, data to be processed by the processor 1210, and data processed by the processor 1210. The memory 1220 may include a high-speed random-access memory (RAM) and/or a nonvolatile computer-readable storage medium (e.g., a flash memory).

The processor 1210 may execute instructions to perform one or more, or all, of the operations or methods described above with reference to FIGS. 1 through 11B. In an example, the processor 1210 may receive a plurality of phase images of different phases obtained by a multi-phase detection sensor 1240, and generate a plurality of preprocessed phase images by performing preprocessing including edge enhancement processing on the phase images. For example, the processor 1210 may remove noise from the phase images and enhance an edge region of an object in each of the phase images. The processor 1210 may generate a plurality of differential images based on the preprocessed phase images, and generate a plurality of low-resolution differential images each having a lower resolution than each of the differential images. For example, the processor 1210 may extract a greatest pixel value from a differential image for each patch region, and generate a low-resolution differential image based on the extracted greatest pixel value. For another example, the processor 1210 may determine an average value of pixel values in a pixel region for each patch region in a differential image, and generate a low-resolution differential image based on the determined average value corresponding to each patch region.

The processor 1210 may generate a minimum map image based on the low-resolution differential images. For example, the processor 1210 may identify a minimum difference value among difference values of corresponding regions between the low-resolution differential images, and determine a pixel value of the minimum map image based on the identified minimum difference value. The pixel value of the minimum map image may correspond to a selected minimum difference value, or an index of a shift displacement corresponding to a low-resolution differential image including the minimum difference value among the differential images. The processor 1210 may perform a liveness detection on the object in the phase images based on the minimum map image. The processor 1210 may obtain a result of the liveness detection by applying the minimum map image and the phase images to a neural network-based liveness detection model (e.g., the liveness detection model 670 of FIG. 6). A resolution of the phase images to be applied to the liveness detection model may be adjusted to correspond to a resolution of the minimum map image. The liveness detection model may output a liveness score as the result of the liveness detection. The processor 1210 may then compare the liveness score to a threshold value, and determine whether the object is a genuine or fake object based on a result of the comparing.

Figure 13:
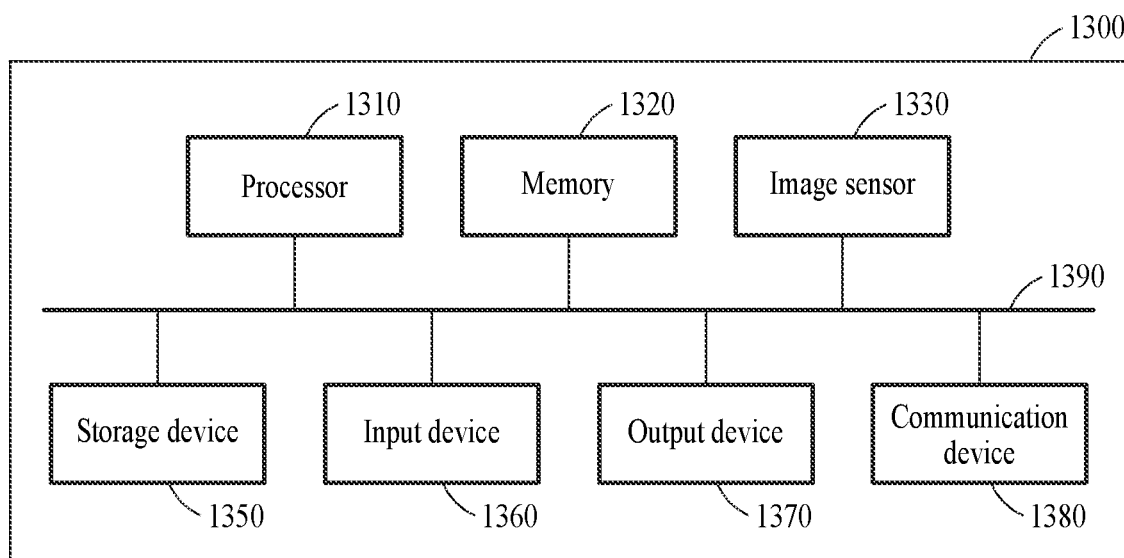
FIG. 13 illustrates an example of an apparatus with liveness detection.

FIG. 13 is a diagram illustrating an example of an electronic apparatus.

An apparatus with liveness detection 1300 (e.g., the electronic apparatus 120 of FIG. 1) may generate an input image obtained by capturing an image of an object and perform a liveness detection on the object in the input image. The apparatus with liveness detection 1300 may perform biometric verification (e.g., facial verification and iris verification) based on a result of the liveness detection performed on the object. The apparatus with liveness detection 1300 may perform the operations or functions of the apparatus with liveness detection 1200 of FIG. 12.

Referring to FIG. 13, the apparatus with liveness detection 1300 may include a processor 1310 (e.g., one or more processors), a memory 1320 (e.g., one or more memories), an image sensor 1330, a storage device 1350, an input device 1360, an output device 1370, and a communication device 1380. The processor 1310, the memory 1320, the image sensor 1330, the storage device 1350, the input device 1360, the output device 1370, and the communication device 1380 may communicate with one another through a communication bus 1390. In a non-limiting example, the apparatus with liveness detection 1300 may include the apparatus with liveness detection 1200 of FIG. 12, the processor 1310 may correspond to the processor 1210, the memory 1320 may correspond to the memory 1220, and the image sensor 1330 may correspond to the multi-phase detection sensor 1240.

The processor 1310 may execute functions and instructions to be executed in the apparatus with liveness detection 1300. The processor 1310 may process instructions stored in the memory 1320 or the storage device 1350. The processor 1310 may perform one or more, or all, of the operations or methods described above with reference to FIGS. 1 through 12. In an example, the processor 1310 may generate preprocessed phase images by performing preprocessing including edge enhancement processing on phase images of different phases obtained through the image sensor 1330, and generate differential images based on the preprocessed phase images. The processor 1310 may generate low-resolution differential images having lower resolutions than the differential images, and generate a minimum map image based on the low-resolution differential images. The processor 1310 may then perform a liveness detection on an object in the phase images based on the minimum map image. The processor 1310 my obtain a liveness score by applying the minimum map image and the phase images to a neural network-based liveness detection model (e.g., the liveness detection model 670 of FIG. 6), and determine a result of the liveness detection based on a result of comparing the liveness score to a threshold value.

The memory 1320 may store data for performing the liveness detection. The memory 1320 may store instructions to be executed by the processor 1310 and information for performing the liveness detection and/or biometric verification.

The image sensor 1330 may generate an image by capturing an image of an object. The image sensor 1330 may include a multi-phase detection sensor (e.g., a 2PD sensor, a QPD sensor, etc.) configured to obtain phase images of different phases.

The storage device 1350 may include a computer-readable storage medium or a computer-readable storage device. The storage device 1350 may store a greater amount of information than the memory 1320, and store the information for a relatively long period of time. The storage device 1350 may include, as a non-limiting example, a magnetic hard disk, an optical disk, a flash memory, and a floppy disk.

The input device 1360 may receive an input from a user, as a non-limiting example, a tactile input, a video input, an audio input, and a touch input. The input device 1360 may include, as a non-limiting example, a keyboard, a mouse, a touchscreen, a microphone, and other devices configured to detect the input from the user and transfer the detected input to the apparatus with liveness detection 1300.

The output device 1370 may provide the user with an output of the apparatus with liveness detection 1300 through a visual, audio, or tactile channel. The output device 1370 may include, as a non-limiting example, a display, a touchscreen, a speaker, a vibration generator, and other devices configured to provide the user with the output. The communication device 1380 may communicate with an external device through a wired or wireless network.

The electronic apparatuses, image sensors, 2PD sensors, sensor pixels, sensor sub-pixels, apparatuses with liveness detection, processors, memories, multi-phase detection sensors, storage devices, input devices, output devices, communication devices, communication buses, electronic apparatus 120, image sensor 130, 2PD sensor 310, sensor pixels 315, sensor sub-pixels 332, 334, 336, 338, 342, 344, 346, 348, apparatus with liveness detection 1200, processor 1210, memory 1220, multi-phase detection sensor 1240, apparatus with liveness detection 1300, processor 1310, memory 1320, image sensor 1330, storage device 1350, input device 1360, output device 1370, communication device 1380, communication bus 1390, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with liveness detection, comprising:
   receiving a plurality of phase images of different phases, captured by a multi-phase detection image sensor;
   generating a plurality of preprocessed phase images by performing preprocessing, including edge enhancement processing, on the plurality of phase images of different phases;
   generating a plurality of differential images based on a result of determining a respective difference in pixel values between the preprocessed phase images; and
   performing a liveness detection on an object in the phase images based on the differential images,
   wherein, in a case in a two-dimensional (2D) object is captured by the multi-phase detection image sensor, there is not a disparity between the plurality of phase images of different phases,
   wherein, in a case in a three-dimensional (3D) object is captured by the multi-phase detection image sensor, there is the disparity between the plurality of phase images of different phases and at least one of the plurality of differential images comprises disparity information associated with the disparity.

2. The method of claim 1, wherein
   the performing of the preprocessing comprises removing noise from the phase images, and
   the edge enhancement processing comprises enhancing an edge region of the object in each of the phase images.

3. The method of claim 1, wherein the performing of the edge enhancement processing comprises applying, to each of the phase images, any one or more of a Sobel filter, an anisotropic filter, a Laplacian filter, a Canny edge filter, and a neural network processing.

4. The method of claim 1, wherein the preprocessed phase images include a first preprocessed phase image and a second preprocessed phase image, and
   wherein the generating of the differential images comprises:
   generating shifted second phase images by shifting the second preprocessed phase image by different shift displacements; and
   generating the differential images including a plurality of differential images each indicating a difference in pixel value between a respective one of the shifted second phase images and the first preprocessed phase image, and a differential image indicating a difference in pixel value between the second preprocessed phase image and the first preprocessed phase image.

5. The method of claim 1, further comprising:
   generating a plurality of low-resolution differential images having lower resolutions than the differential images, based on a result of reducing a respective size of the differential images; and
   generating a minimum map image based on the low-resolution differential images, the minimum map image representing a minimum difference value among difference values between the low-resolution differential images,
   wherein the performing of the liveness detection comprises performing the liveness detection on the object in the phase images based on the minimum map image.

6. The method of claim 5, wherein the generating of the low-resolution differential images comprises:
   extracting, from a differential image of the differential images, a greatest pixel value for each of a plurality of patch regions in the differential image; and generating a low-resolution differential image of the low-resolution differential images based on the extracted greatest pixel values.

7. The method of claim 5, wherein the generating of the low-resolution differential images comprises:
determining an average value of pixel values in a pixel region for each of a plurality of patch regions in a differential image of the differential images; and
generating a low-resolution differential image based on the average values corresponding to the patch regions.

8. The method of claim 5, wherein the generating of the minimum map image comprises:
identifying a minimum difference value among difference values of corresponding regions between the low-resolution differential images; and
determining a pixel value of the minimum map image based on the identified minimum difference value.

9. The method of claim 8, wherein the pixel value of the minimum map image corresponds to either one of:
the minimum difference value; and
an index of a shift displacement corresponding to a low-resolution differential image including the minimum difference value.

10. The method of claim 5, wherein the performing of the liveness detection comprises obtaining a result of the liveness detection by applying the minimum map image and the phase images to a neural network-based liveness detection model.

11. The method of claim 10, wherein a resolution of the phase images applied to the liveness detection model is adjusted to correspond to a resolution of the minimum map image.

12. A non-transitory computer-readable storage medium storing instructions that, when executed by a processor, configure the processor to perform the method of claim 1.

13. An apparatus with liveness detection, comprising:
a processor configured to:
generate a plurality of preprocessed phase images by performing preprocessing, including edge enhancement processing, on phase images of different phases, captured by a multi-phase detection image sensor;
generate a plurality of differential images based on a result of determining a respective difference in pixel values between the preprocessed phase images; and
perform a liveness detection on an object in the phase images based on the differential images,
wherein, in a case in a two-dimensional (2D) object is captured by the multi-phase detection image sensor, there is not a disparity between the plurality of phase images of different phases,
wherein, in a case in a three-dimensional (3D) object is captured by the multi-phase detection image sensor, there is the disparity between the plurality of phase images of different phases and at least one of the plurality of differential images comprises disparity information associated with the disparity.

14. The apparatus of claim 13, wherein the processor is configured to:
for the performing of the preprocessing, remove noise from the phase images; and
for the edge enhancement processing, enhance an edge region of the object in each of the phase images.

15. The apparatus of claim 13, wherein
the preprocessed phase images include a first preprocessed phase image and a second preprocessed phase image, and
wherein the processor is configured to:
generate shifted second phase images by shifting the second preprocessed phase image by different shift displacements; and
generate the differential images including a plurality of differential images each indicating a difference in pixel value between a respective one of the shifted second phase images and the first preprocessed phase image, and a differential image indicating a difference in pixel value between the second preprocessed phase image and the first preprocessed phase image.

16. The apparatus of claim 13, wherein the processor is configured to:
generate a plurality of low-resolution differential images having lower resolutions than the differential images, based on a result of reducing a respective size of the differential images;
generate a minimum map image based on the low-resolution differential images, the minimum map image representing a minimum difference value among difference values between the low-resolution differential images; and
perform a liveness detection on an object in the phase images based on the minimum map image.

17. The apparatus of claim 16, wherein, for the generating of the low-resolution differential images, the processor is configured to:
extract, from a differential image of the differential images, a greatest pixel value for each of a plurality of patch regions in the differential image; and
generate a low-resolution differential image of the low-resolution differential images based on the extracted greatest pixel values.

18. The apparatus of claim 16, wherein, for the generating of the low-resolution differential images, the processor is configured to:
determine an average value of pixel values in a pixel region for each of a plurality of patch regions in a differential image of the differential images;
generate a low-resolution differential image based on the average values corresponding to the patch regions;
identify a minimum difference value among difference values of corresponding regions between the low-resolution differential images; and
determine a pixel value of the minimum map image based on the identified minimum difference value.

19. The apparatus of claim 16, wherein
for the performing of the liveness detection, the processor is configured to obtain a result of the liveness detection by applying the minimum map image and the phase images to a neural network-based liveness detection model, and
a resolution of the phase images applied to the liveness detection model is adjusted to correspond to a resolution of the minimum map image.

20. An electronic apparatus, comprising:
a multi-phase detection sensor configured to obtain a plurality of phase images of different phases, captured by a multi-phase detection image sensor; and
a processor configured to:
generate a plurality of preprocessed phase images by performing preprocessing, including edge enhancement processing, on the phase images;
generate a plurality of differential images based on a result of determining a respective difference in pixel values between the preprocessed phase images; and
perform the liveness detection on an object in the phase images based on the differential images, wherein, in a case in a two-dimensional (2D) object is captured by the multi-phase detection image sensor, there is not a disparity between the plurality of phase images of different phases, wherein, in a case in a three-dimensional (3D) object is captured by the multi-phase detection image sensor, there is the disparity between the plurality of phase images of different phases and at least one of the plurality of differential images comprises disparity information associated with the disparity.

* * * * *